Dec. 23, 1958     C. H. WALKER ET AL     2,866,117
ELECTROLUMINESCENT PANEL
Filed April 11, 1956
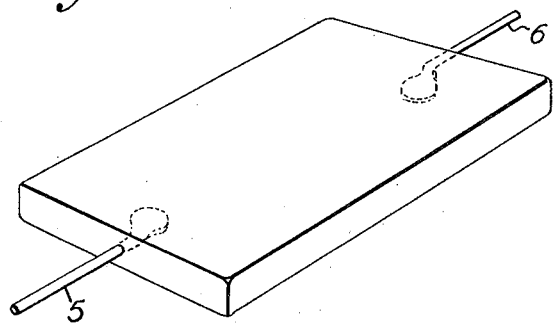
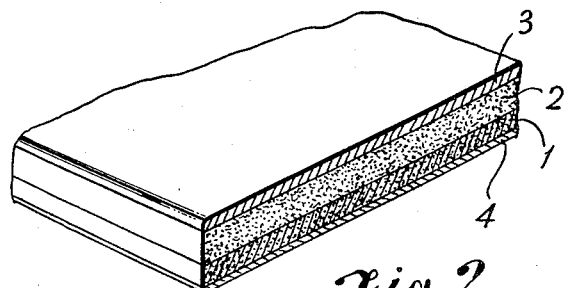
INVENTORS
CYRIL HUBERT WALKER
MAURICE GEORGE CLARKE
By 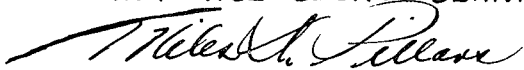
THEIR ATTORNEY

2,866,117
ELECTROLUMINESCENT PANEL

Cyril Hubert Walker, Rugby, and Maurice George Clarke, Church Lawford, near Rugby, England, assignors to The British Thomson-Houston Company Limited, London, England, a British company Application April 11, 1956, Serial No. 577,474

Claims priority, application Great Britain April 15, 1955

2 Claims. (Cl. 313—108)

This invention relates to electroluminescent devices and to their manufacture.

Such devices embody a layer of an electroluminescent material on either face of which are located electrically conducting films, at least one of which is light transmissive, caused to be closely spaced from the layer of electroluminescent material. The material luminesces when a potential of sufficient value is applied between the conducting films, the resulting light being visible through the light-transmissive film. With some electroluminescent materials, an inverse effect is exhibited, the impingement of light on the electroluminescent layer producing a modulation of the potential occurring across the films. An electroluminescent material which exhibits the inverse effect above-mentioned is zinc sulphide activated with manganese. The invention includes within its ambit both kinds of electroluminescent material.

It has been usual, hitherto, to locate the electroluminescent layer on the surface of a glass plate, the surface having previously been rendered electrically conducting, e. g. by treating with tin chloride.

According to the invention the electroluminescent layer is provided by a mixture of powdered electroluminescent material and powdered glass which is fused to one face of a wafer of a refractory dielectric material, the electrically conducting films through the intermediary of which electric potential is applied to the electroluminescent material being located on the remaining exposed faces of the refractory material and the fused layer, at least that conducting film which is present on the fused layer being light transmissive.

The refractory dielectric material which we prefer to employ is a ceramic consisting of polycrystalline barium titanate or titanium dioxide; such a material possesses such an improved permittivity and electrical breakdown strength as compared with the fused layer, that the electroluminescence is increased, since the greater potential stress can be applied to the electroluminescent material without breakdown. Good reflection of the light produced by the phosphor is also obtained by this layer, giving a greater brightness at the transparent conducting surface. A high permittivity glass may alternatively be used for the refractory dielectric material.

In the accompanying drawing we have shown in Fig. 1, in perspective view, an electroluminescent panel in accordance with the invention, Fig. 2 being an enlarged view of a portion of the panel to show the positioning of the various layers of which the panel is made up.

Referring to the drawing, the main supporting member of which the panel is constructed consists of a wafer 1 of dielectric material, such as the polycrystalline barium titanate above mentioned. It may be of the order of .005″ in thickness. On it is formed a layer 2 composed of a fused mixture of powdered glass and a phosphor, which is electroluminescent, such as zinc sulphide activated with manganese. On the electroluminescent material-glass layer is applied an electrical layer 3 of transparent material, and on the lower face of the dielectric material is applied a second electrically conducting layer 4, which need not be transparent. Conductors 5, 6 make contact with the films 3, 4 respectively, so that electric potentials can be applied to, or received from, those layers, according to the use to which the panel is put.

The proportion of the activator in the electroluminescent material may be of the order of 0.25% by weight of the phosphor. The glass employed in the mixture with the luminescent material, when zinc sulphide is the phosphor, may have a composition 55% to 80% $B_2O_3$, 10% to 25% $SiO_2$, 2% to 12% $Al_2O_3+MgO$ (MgO not being more than 6%) and from 5% to 15% of $Na_2O+NaF$, the remainder being $GeO_2$.

The glass should be reduced to a powder having a fineness such that it will pass through a 200 mesh sieve, and may be pulverized in a ball mill, or by any other convenient means.

An intimate mixture of the powdered glass and phosphor may be applied to the surface of the wafer 1 by spraying or settling from a suspension in a viscous liquid, such as a solution of nitrocellulose in amyl acetate.

The wafer is then raised in temperatures to the melting point of the glass, whereupon the fused mass of electroluminescent material and glass results. The glass is chosen so that it does not prove deleterious to the electroluminescent material during the manufacture or later. If a high permittivity glass is used for the dielectric wafer, its melting point should be materially higher than that of the glass used in the electroluminescent layer.

The fused layer may be rendered conducting on its external surface to form film 3 by any of the conducting glass techniques, e. g. the treatment with tin chloride as mentioned above. The conducting film 4 may consist of a metallic film such as aluminum, silver, etc, evaporated onto the other side of the ceramic wafer. A film of "Aquadag" or other suitable conducting paint may also be used. The terminal means in the form of a wire or strip electrode 5 is attached to the transparent conducting surface, for example, by soldering with a tin-indium solder, and to the opaque conducting film 6 by sticking with the conducting paints previously mentioned. Finally a thin coating of clear protective varnish or resin may be applied to the whole panel, by a dipping process to provide electrical insulation and protection from atmospheric moisture.

What we claim is:

1. An electroluminescent device comprising a self-supporting wafer of dielectric material of a refractory nature selected from the group consisting of titanium dioxide and barium titanate, an electroluminescent layer composed of an intimate fusion of powdered electroluminescent material and powdered glass supported on one face of said wafer, an electrically conductive layer on the other face of said wafer, an electrically conducting radiation transmissive layer on the exposed face of said electroluminescent layer opposite said electrically conductive layer, and terminal means attached to said electrically conducting layers.

2. An electroluminescent device comprising a self-supporting wafer of refractory dielectric material selected from the group consisting of titanium dioxide and barium titanate, an electroluminescent layer composed of an intimate mixture of powdered luminescent material and powdered glass fused to one face of said wafer, an electrically conducting light transmissive film on the outer face of said electroluminescent layer, a second electrically conductive film on the face of said wafer opposite said electroluminescent layer, terminal means attached to said two films, and a casing of insulating material enclosing said wafer and second conductive film to exclude atmospheric pollution while exposing said electroluminescent layer to radiation through said light transmissive film, and said terminal means providing for connection to an external circuit.

References Cited in the file of this patent

UNITED STATES PATENTS

| | | |
|---|---|---|
| 2,222,788 | Touceda | Nov. 26, 1940 |
| 2,509,071 | Pennybacker | May 23, 1950 |
| 2,689,188 | Hushley | Sept. 14, 1954 |

OTHER REFERENCES

The New Phenomenon of Electroluminescence of Its Possibilities for the Investigation of Crystal Lattice, by G. Destriau, Philosophical Magazine, V. 38, October 1947.